June 22, 1954  E. E. HEINZELMAN  2,681,471
MOLDING MACHINE
Filed Nov. 29, 1951  4 Sheets-Sheet 1

INVENTOR
EARL E. HEINZELMAN
by
Walter J. Kaufman

ATTORNEY

June 22, 1954

E. E. HEINZELMAN 2,681,471

MOLDING MACHINE

Filed Nov. 29, 1951

INVENTOR
EARL E. HEINZELMAN

ATTORNEY

June 22, 1954  E. E. HEINZELMAN  2,681,471
MOLDING MACHINE
Filed Nov. 29, 1951  4 Sheets-Sheet 3

INVENTOR
EARL E. HEINIZELMAN
by Walter J. Kaufman

ATTORNEY

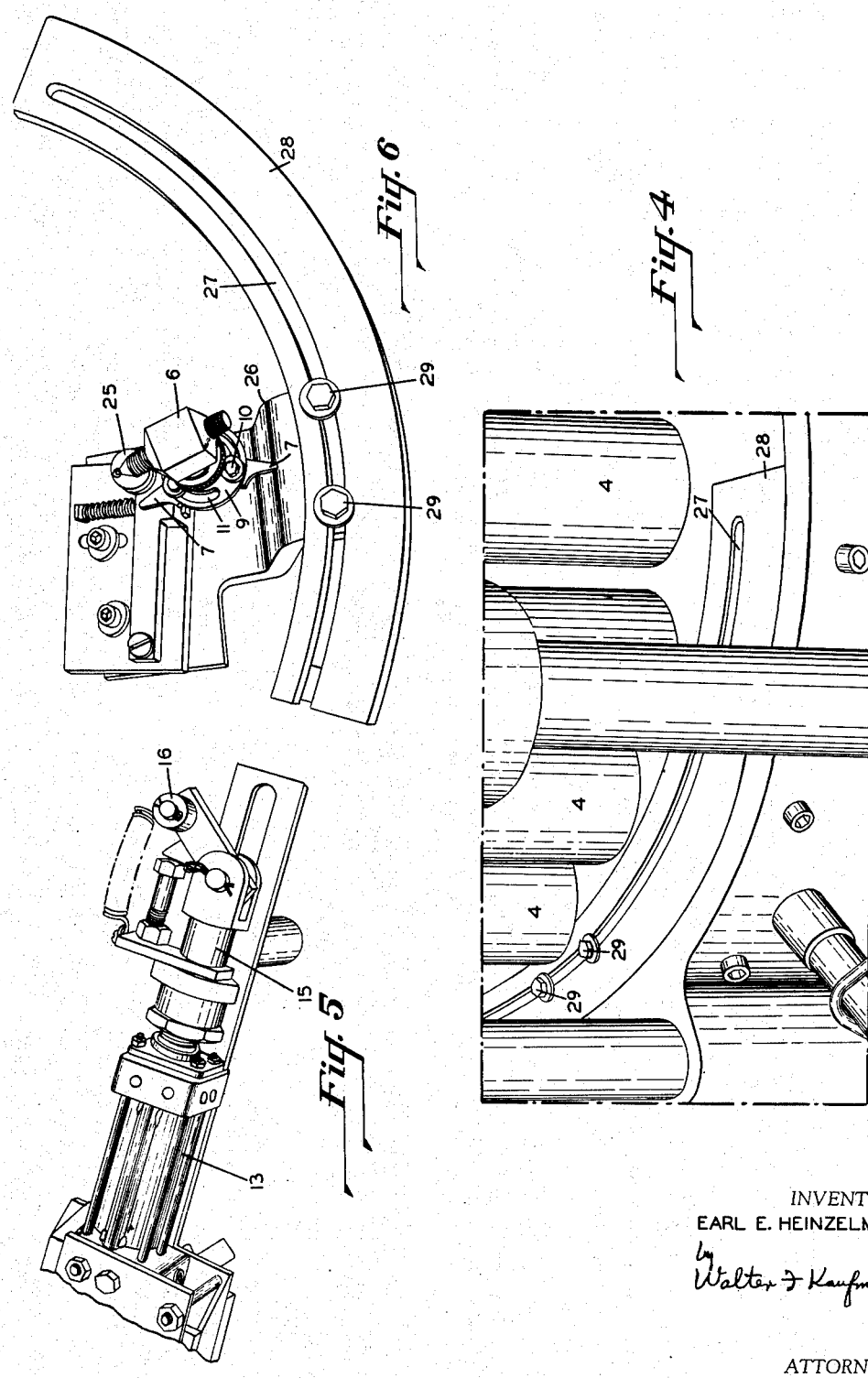

Patented June 22, 1954

2,681,471

UNITED STATES PATENT OFFICE 2,681,471

MOLDING MACHINE

Earl E. Heinzelman, Manheim Township, Lancaster County, Pa., assignor to Armstrong Cork Company, Lancaster, Pa., a corporation of Pennsylvania Application November 29, 1951, Serial No. 258,795

5 Claims. (Cl. 18—20)

1

This invention relates to a molding machine and, more particularly, to a mechanism for controlling the hydraulic pressure on conventional rotary hydraulic molding machines.

In the manufacture of molded articles on hydraulic molding machines of the rotary type, a plurality of sequentially arranged pairs of complementary mold elements are brought together under sufficient pressure to mold and cure an article from a quantity of thermosetting molding composition carried by one of the mold elements of each pair. In one type of rotary molding machine currently in use, there is provided a centrally located rotary valve for commutating hydraulic fluid to hydraulic cylinders which move around the machine, each cylinder carrying an element of a complementary pair of mold elements. During their path of travel around the machine, the molding pressure is applied during a certain portion of the cycle of rotation; and the pressure is cut off during the remainder of the cycle. In the molding of articles on machines of this type using thermosetting molding compositions, it has been found desirable to allow the molding composition to breathe during a certain period of the molding cycle just after the mold has been initially closed and pressure has been applied. This breathing is necessary to permit the escape of entrapped gases which if not exhausted cause defective molded articles.

One of the more common types of rotary molding machine is that disclosed in Lauterbach Patent 2,155,316, issued April 18, 1939. This patent discloses a rotary valve which is effective for supplying hydraulic fluid under pressure to the moving hydraulic cylinders during a portion of the cycle of rotation and for cutting off the supply of fluid during the remainder of the cycle. There is also disclosed in the patent above referred to a means for temporarily halting the flow of fluid to permit breathing immediately after the mold has closed. This structure, however, is limited to a set breathing period for all molding operations on the machine. It has been found desirable in producing molded articles to adjust the period of breathing in order to compensate for varying characteristics in different molding compositions. It is also necessary to adjust the breathing period according to the size of the molded article being produced. In other words, some types of molding compositions require a longer breathing cycle than other types, and likewise thick-welled molded articles usually require a longer breathing period than thin-walled articles. In structures such as that disclosed in the Lauterbach patent, adjustment of this breathing period is impossible.

2

In order to overcome the disadvantages above enumerated, I have developed a system whereby a separate valve is located on one of the hydraulic lines from the rotary valve to the hydraulic cylinder. This valve is actuated by a suitable mechanism on the frame of the machine, and the controls are adjustable so that the valves may be open and closed during different portions of the cycle of rotation of the machine. With this arrangement, it is possible to have a relatively short breathing period or a longer breathing period, depending on the particular requirements of the molding composition and the size of the article being produced.

An object of this invention is to provide a valve in the hydraulic supply line of a rotary molding machine which may be opened and closed by adjustable control mechanism suitably mounted on the stationary framework of the machine.

Another object of this invention is to provide control mechanism for the supply of hydraulic pressure to molding tools in which the control mechanism is adjustable to alter the cycle during which the hydraulic line is shut off.

In order that my invention may be more readily understood, it will be described in connection with the attached drawings, in which Figure 1 shows the position of the valve in the hydraulic line between the rotary valve and the cylinder;

Figure 4 shows the adjustable bracket for the valve opening mechanism;

Figure 5 shows the device for closing the valves; and

Figure 6 shows the device for opening the valves.

Figure 1:
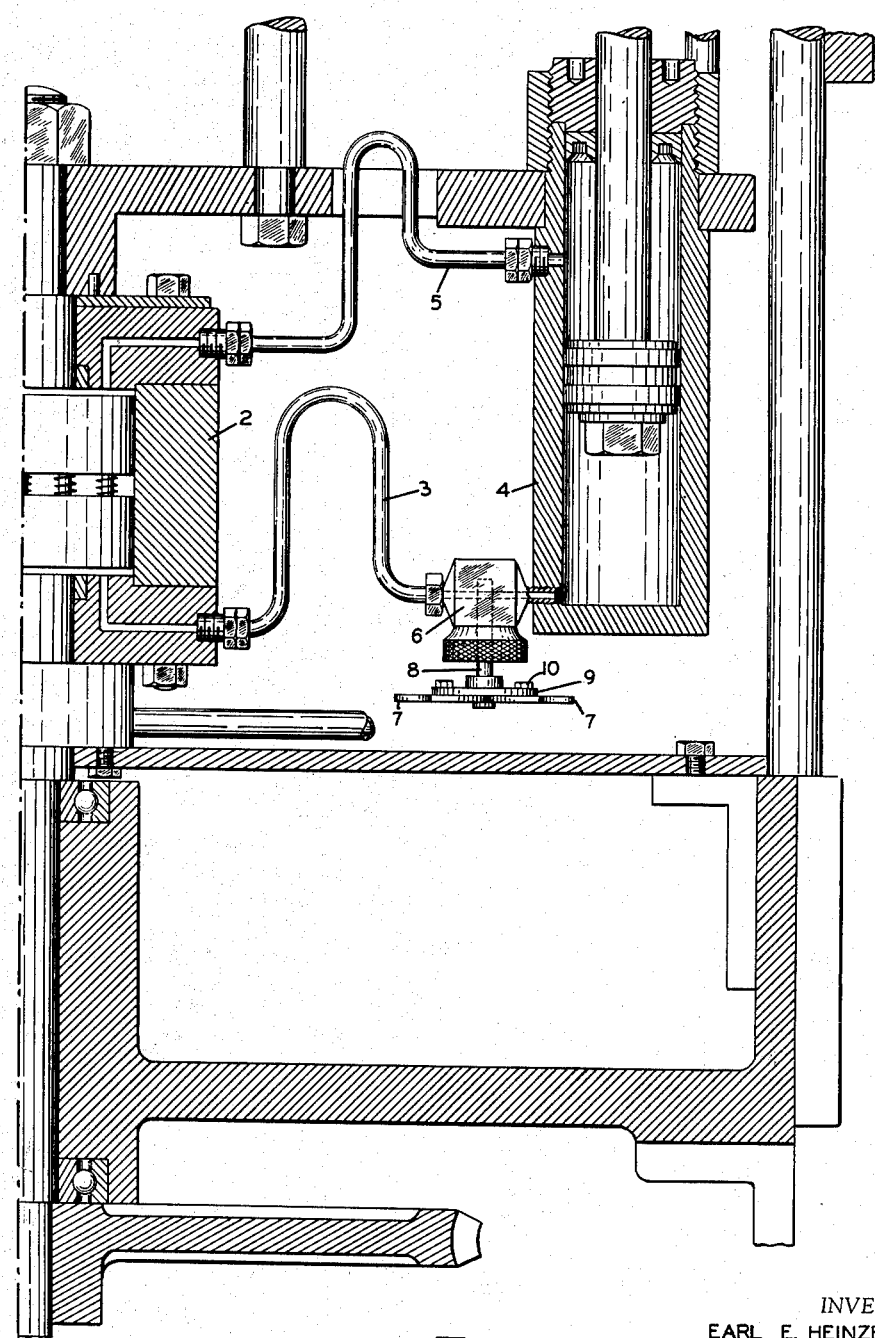
Figure 2:
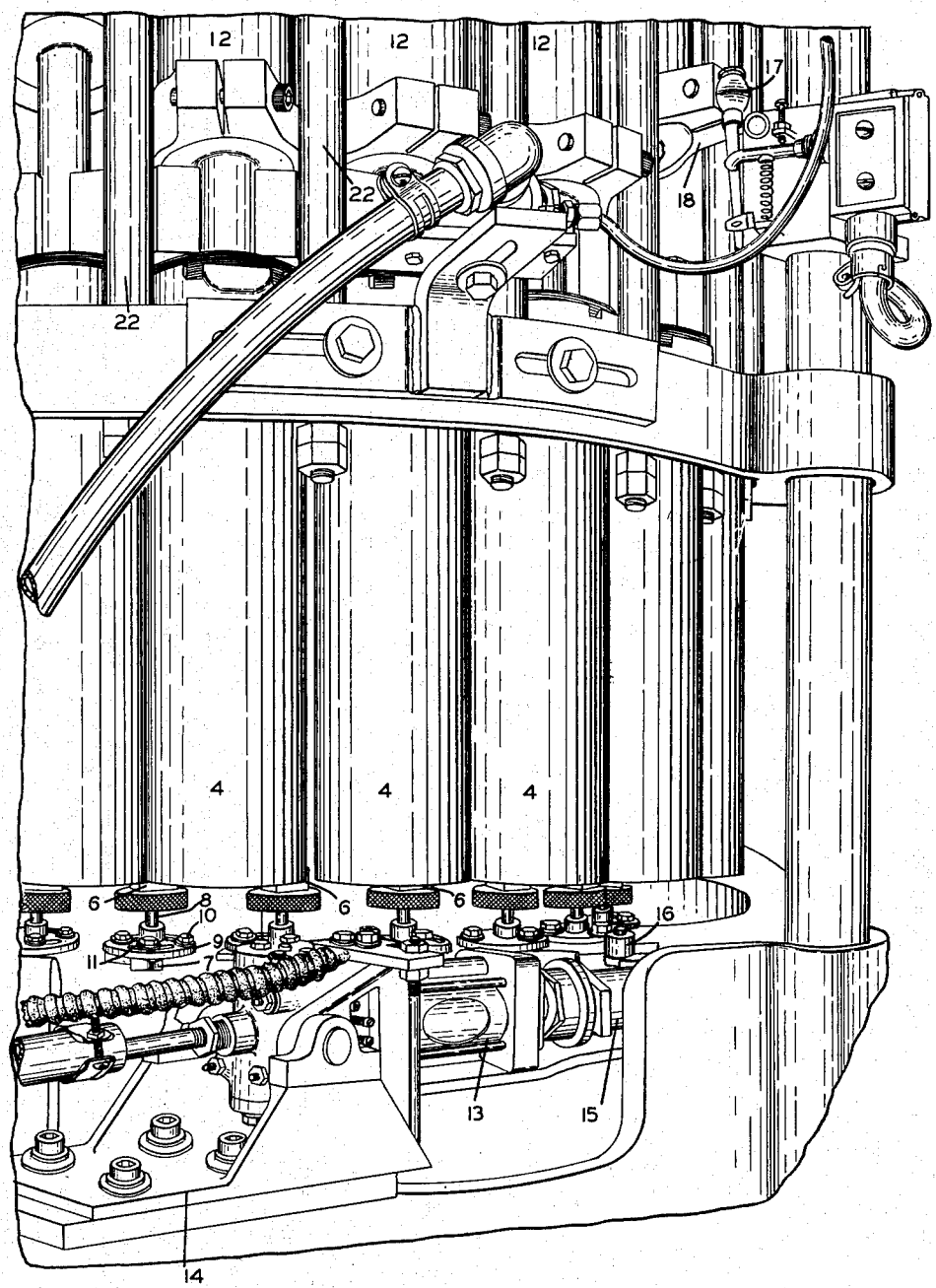
Figure 2 is a front elevational view of a conventional rotary molding machine showing the valves and the mechanism for closing the same.
Figure 3:
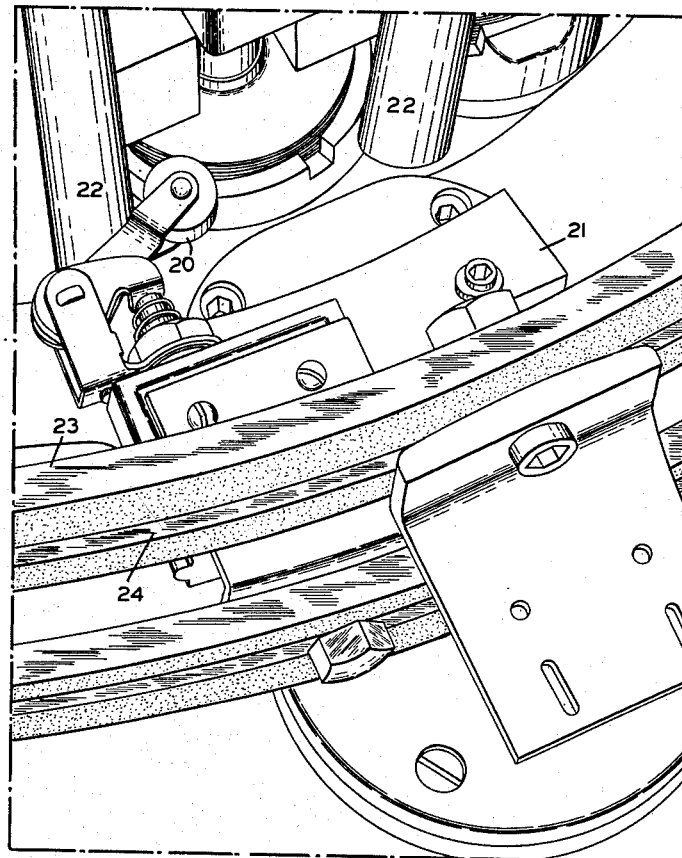
Figure 3 shows the adjustable mechanism for controlling the return of the valve actuating mechanism.

Referring to Figure 1, there is shown a conventional rotary hydraulic valve 2 having hydraulic lines 3 conducting hydraulic fluid under pressure from the rotary valve 2 to the lower part of hydraulic cylinders 4 to force the piston in the cylinders upwardly to exert molding pressure to the molding composition located in the mold element carried by the ram of the piston. The rotary valve also has hydraulic lines 5 leading to the top of the hydraulic cylinders 4 to supply fluid under pressure to move the piston downwardly to separate the mold elements. Positioned in the line 3 leading to the bottom of the cylinders 4 is a valve 6 which may be opened and closed to control the flow of hydraulic fluid from the rotary valve 2 to the cylinders 4. It will be understood that rotary molding machines of the type here under consideration may have any number of cylinders 4 supplied from one central rotary valve 2, said rotary valve being provided with a line 3 for each of the cylinders 4. The valve 6 shown in Figure 2 comprises actuating arms 7, which are located on a horizontal plane beneath the bottom of the cylinders 4. The arms 7 rotate about a central shaft 8, an adjusting plate 9 is pinned to the shaft 8, and the arms 7 are secured to the plate 9 by means of studs 10. The studs 10 pass through segment grooves 11 in plate 9, and movement therein permits adjustment of the arms 7 to properly align them so that each valve will be actuated at the same identical point in the path of travel of the valves around the machine.

In order to close the valves, it is necessary to do so with a quick snap action to insure that pressure will be cut off uniformly on all cylinders at a given point in their path of travel about the machine so that the rams 12 will all be at the same height at the time the hydraulic pressure is cut off. This is accomplished by an air cylinder shown generally at 13, which is mounted on the framework of the machine by means of the bracket 14. The air piston ram 15 of the air cylinder 13 carries a roller 16, which is positioned in the path of travel of the arms 7 as the valves move around the machine with the cylinders.

The air cylinder 13 is controlled by a contact switch 17 mounted on the framework of the machine to contact the clamp 18 mounted on the movable ram 12 the movement of which is controlled by the hydraulic cylinder. The switch 17 controls the cylinder 13 through a conventional electric solenoid mechanism which actuates the air cylinder, pulling the piston in, moving the roller 16 into engagement with the arm 7, and rotating the same in a counterclockwise direction when viewed from the bottom. After the air piston ram 15 of the cylinder 13 has moved inwardly, closing the valve, it is necessary to force the air piston ram 15 forward so that the roller 16 will be in position to engage the next valve. This is accomplished by means of another contact switch 20, which is positioned on an adjustable bracket 21 and engages the rods 22 as the machine rotates. The switch 20 closes an electric circuit through a conventional solenoid, energizing the air cylinder 13 to move the air piston ram 15 outwardly, carrying with it the roller 16, putting it in position to contact the next valve at the same point in its path of travel that the preceding valve was contacted.

The bracket 21 is mounted on a segment 23 attached to the stationary framework of the machine, said segment 23 being provided with grooves 24 so that the mounting bolts may be slid along the groove to adjust the position of the switch 20 so as to accurately control the time at which the air cylinder will force the roller forward to be in position for the next valve.

The contact switch 17 is also adjustably mounted vertically and radially with respect to its mounting point so as to contact the clamp 18 at the exact desired time to actuate the air cylinder 13 to close the valve. This may be adjusted to stop the upward movement of the ram 12 at any given point as the mold is closing. The position of the switch is such that it will contact the clamp 18 only when the hydraulic piston is moving upwardly to close the mold elements.

After the valve has been closed and the molding composition in the molds has had its desired breathing cycle, the valve is opened by means of a spring loaded stop 25 (Figure 6) mounted on the bottom of the machine in such position as to contact the other end of the arm 7, rotating the same in a clockwise direction, when viewed from the bottom, opening the valve and allowing hydraulic fluid to pass freely through the line between the rotary valve 2 and the cylinder 4. This stop 25 is spring loaded so as to permit the completion of the opening cycle regardless of the position of the center line of the valve with respect to the stop 25. Stop 25 is also mounted on an adjustable bracket 26, which slides in groove 27 of segment 28. This segment 28 is sufficiently long to permit the bracket 26 to be slid through a considerable distance to thereby lengthen or shorten the breathing cycle, depending on the particular characteristics of the molding composition and the size of the article being produced. Figure 4 shows the segment 28 in position along the bottom of the machine underneath the path of travel of the cylinders. Bolts 29, which attach bracket 26 to the segment 28, are visible in Figure 4; but the actual stop 25 is not visible, inasmuch as it is located beneath the cylinders.

It will be clear from this disclosure that I have developed a system for controlling the supply of hydraulic fluid to a pressure cylinder in such a manner that the breathing cycle of the molding composition can be varied, depending on the particular characteristics of the molding composition and the size of the article being produced.

I claim:

1. In a rotary molding machine, a stationary frame, a rotatable support, a rotary hydraulic valve connected to said rotatable support for actuation upon rotation of said rotatable support with respect to said stationary frame, a hydraulic cylinder carried by the rotatable support, a pair of hydraulic fluid pressure lines connecting said valve with said cylinder, one of said lines being connected to said cylinder on one side of a movable piston and the other of said lines being connected to the opposite side of said piston, said rotary hydraulic valve being adapted to supply hydraulic fluid under pressure at intermittent intervals through said lines to alternate sides of said cylinder during each cycle of rotation of the hydraulic valve, a control valve located on one of the fluid pressure lines to interrupt the flow of fluid therethrough during a portion of the time the fluid in the line is under pressure, an actuating mechanism carried by said rotatable support to open and close said control valve, and means positioned on the stationary frame to engage said valve-actuating means as the valve travels in its predetermined path.

2. In a rotary molding machine, a stationary frame, a rotatable support, a rotary hydraulic valve connected to said rotatable support for actuation upon rotation of said rotatable support with respect to said stationary frame, a hydraulic cylinder carried by the rotatable support, a pair of hydraulic fluid pressure lines connecting said valve with said cylinder, one of said lines being connected to said cylinder on one side of a movable piston and the other of said lines being connected to the opposite side of said piston, said rotary hydraulic valve being adapted to supply hydraulic fluid under pressure at intermittent intervals through said lines to alternate sides of said cylinder during each cycle of rotation of the hydraulic valve, a control valve located on one of the fluid pressure lines to interrupt the flow of fluid therethrough during a portion of the time the fluid in the line is under pressure, actuating arms carried by said rotatable support to open and close said control valve, and adjustable means positioned on the stationary frame to engage said actuating arms as the valve travels in its predetermined path.

3. In a rotary molding machine, a stationary frame, a rotatable support, a rotary hydraulic valve connected to said rotatable support for actuation upon rotation of said rotatable support with respect to said stationary frame, a hydraulic cylinder carried by the rotatable support, a pair of hydraulic fluid pressure lines connecting said valve with said cylinder, one of said lines being connected to said cylinder on one side of a movable piston and the other of said lines being connected to the opposite side of said piston, said rotary hydraulic valve being adapted to supply hydraulic fluid under pressure at intermittent intervals through said lines to alternate sides of said cylinder during each cycle of rotation of the hydraulic valve, a control valve located on one of the fluid pressure lines to interrupt the flow of fluid therethrough during a portion of the time the fluid in the line is under pressure, an actuating mechanism carried by said rotatable support to open and close said control valve, a pneumatic cylinder positioned on the stationary frame to engage said valve-actuating means, and an adjustable stop positioned on the stationary frame to engage the valve-actuating means as the valve travels in its predetermined path.

4. In a rotary molding machine, a stationary frame, a rotatable support, a rotary hydraulic valve connected to said rotatable support for actuation upon rotation of said rotatable support with respect to said stationary frame, a hydraulic cylinder carried by the rotatable support, a pair of hydraulic fluid pressure lines connecting said valve with said cylinder, one of said lines being connected to said cylinder on one side of a movable piston and the other of said lines being connected to the opposite side of said piston, said rotary hydraulic valve being adapted to supply hydraulic fluid under pressure at intermittent intervals through said lines to alternate sides of said cylinder during each cycle of rotation of the hydraulic valve, a control valve located on one of the fluid pressure lines to interrupt the flow of fluid therethrough during a portion of the time the fluid in the line is under pressure, an actuating mechanism carried by said rotatable support to open and close said control valve, an adjustable contact switch positioned on the stationary frame to close said valve when a predetermined amount of fluid has entered the cylinder, and an adjustable stop positioned on said stationary frame to open said valve at a predetermined point in the path of travel of the valve.

5. In a rotary molding machine, a stationary frame, a rotatable support, a rotary hydraulic valve connected to said rotatable support for actuation upon rotation of said rotatable support with respect to said stationary frame, a hydraulic cylinder carried by the rotatable support, a pair of hydraulic fluid pressure lines connecting said valve with said cylinder, one of said lines being connected to said cylinder on one side of a movable piston and the other of said lines being connected to the opposite side of said piston, said rotary hydraulic valve being adapted to supply hydraulic fluid under pressure at intermittent intervals through said lines to alternate sides of said cylinder during each cycle of rotation of the hydraulic valve, a control valve located on one of the fluid pressure lines to interrupt the flow of fluid therethrough during a portion of the time the fluid in the line is under pressure, an actuating mechanism carried by said rotatable support to open and close said control valve, an adjustable contact switch positioned on the stationary frame to close said valve when a predetermined amount of fluid has entered the cylinder, said contact switch being actuated by the movement of the piston in said cylinder, and an adjustable stop positioned on the stationary frame to open said valve at a predetermined point in the path of travel of the valve.

References Cited in the file of this patent

UNITED STATES PATENTS

| Number | Name | Date |
|---|---|---|
| 1,991,706 | Seabury | Feb. 19, 1935 |
| 2,155,316 | Lauterbach | Apr. 18, 1939 |
| 2,498,264 | Goldhard | Feb. 21, 1950 |